United States Patent [19]

Scarrott

[11] 4,242,904
[45] Jan. 6, 1981

[54] WORKPIECE STOP MEANS FOR A SHEET METAL WORKING MACHINE

[75] Inventor: Brian D. Scarrott, Northampton, England

[73] Assignee: Northampton Sheet Metal Fabrications Ltd., Northampton, England

[21] Appl. No.: 21,745

[22] Filed: Mar. 19, 1979

[30] Foreign Application Priority Data

Apr. 17, 1978 [GB] United Kingdom ............... 14999/78

[51] Int. Cl.³ ............................................. B21D 11/22
[52] U.S. Cl. ........................................................ 72/461
[58] Field of Search .................. 72/461, 389, 386, 36, 72/419, 27

[56] References Cited

U.S. PATENT DOCUMENTS

| | | | |
|---|---|---|---|
| 3,733,885 | 5/1973 | Brauer | 72/389 |
| 3,824,822 | 7/1974 | Richardson | 72/461 |
| 3,826,119 | 7/1974 | Marotto | 72/36 |
| 4,084,424 | 4/1978 | Roch | 72/461 |
| 4,089,200 | 5/1978 | Wingate | 72/461 |

Primary Examiner—Francis S. Husar
Assistant Examiner—Gene P. Crosby
Attorney, Agent, or Firm—Lawrence Rosen

[57] ABSTRACT

Workpiece stop means for a sheet metal working machine comprising a holder for a plurality of stop members preferably in the form of strips of metal, the holder having a reference face, each of the stop members being of a respective accurately determined length and being engagable with the holder with one end of each of the stop members abutting the reference face of the holder, the stop members being sequentially presentable each for abutment of its other end with a co-operating abutment member mounted on a reciprocable carriage, which carriage also mounts a workpiece backstop of the machine, whereby, by such abutment of the abutment member with said other end of successive ones of the stop members, the carriage and thus the workpiece backstop is positioned at desired locations for successive operations of the machine, the holder being indexed parallel to the reference face thereof between successive abutments.

5 Claims, 7 Drawing Figures

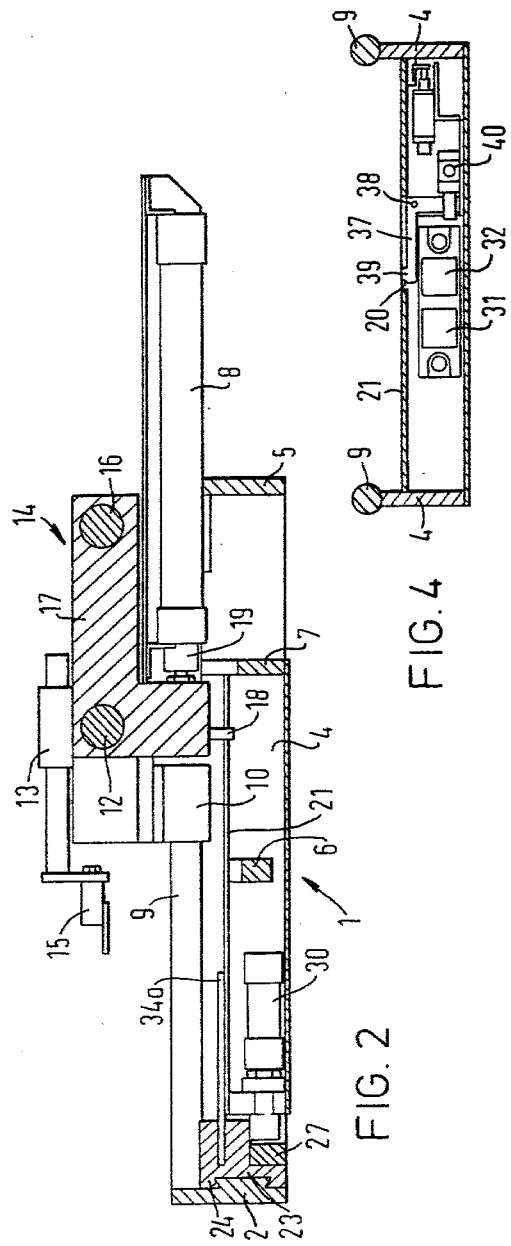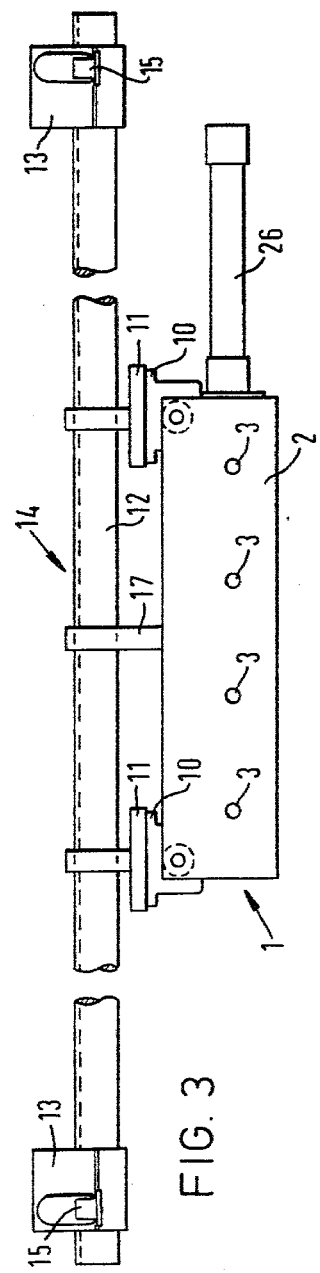

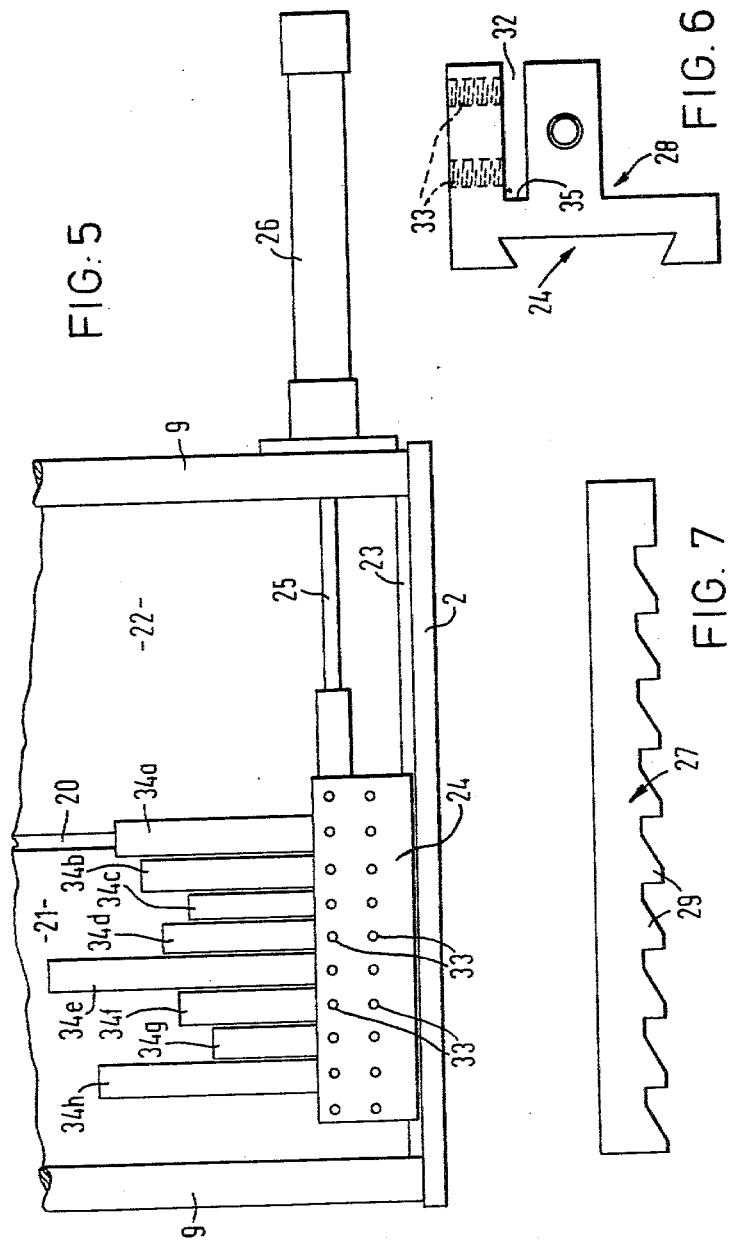

WORKPIECE STOP MEANS FOR A SHEET METAL WORKING MACHINE

The invention relates to workpiece stop means for a sheet metal working machine. Primarily the invention is applicable to folding and bending presses for sheet metal but is also applicable to other sheet metal working machines such as guillotines and punches.

A sheet metal folding or bending machine normally has an upper tool and a lower tool, the tools being relatively movable towards one another under the control of an operator who inserts a sheet of metal between the opened tools up to a limit set by a backstop before operating the press to cause the tools to move towards one another and effect a bending or folding operation. Normally a plurality of bending operations are affected on each workpiece sequentially, normally up to a maximum of eight operations, and generally for each operation the backstop is required to be at a different spacing from the tools to the spacing required for the other operations. Bending machines have been equipped with numerical controls for positioning the backstop for each of a plurality of successive operations, the required setting of the backstops being dialled into the numerical control from data provided by the draughtsman or a memory tape cassette being used to effect setting of backstops for a plurality of operations. Such memory cassette is very useful where a repeat order is to be carried out. The disadvantage of numerical controls however is that they are very expensive and repair if they malfunction is normally beyond the capabilities of the normal operator or machine tool setter.

The invention has among its objects to provide simple but effective workpiece stop means which can be inexpensively produced.

According to the invention workpiece stop means for a sheet metal working machine comprises a holder for a plurality of stop members, said holder having a reference face, each of said stop members being of a respective determined length and being engagable with said holder with one end of each of the stop members abutting said reference face of the holder, said stop members being sequentially presentable each for abutment of its other end with a co-operating abutment member mounted on a reciprocable carriage, which carriage also mounts a workpiece backstop of the machine, whereby, by said abutment of said abutment member with said other end of successive ones of said stop members, the carriage and thus the workpiece backstop is positioned at desired locations for successive operations of the machine.

Advantageously each of the stop members comprises a strip of metal accurately cut to a desired length.

The carriage is advantageously reciprocable, preferably by a pneumatic ram, away from and towards said reference face between each operation of the machine and the holder in indexable in a direction parallel to said reference face to present a further one of said stop members in position for abutment with the abutment member of the carriage, before the carriage completes its reciprocation.

Preferably, the holder is indexed under the force of a pneumatic ram and mounts a ratchet bar which co-operates with a pair of alternately operable pneumatically driven pawls to control the indexing movement. Reciprocation of the carriage and indexing of the holder is tripped automatically following each operation of the machine.

Trip means are preferably provided to return the holder to an initial indexed position following an operation of the machine with the abutment member abutted with the last of the plurality of stop members provided on the holder i.e. at the end of a sequence of bending operations effected on a single workpiece, to reset the workpiece stop means to the initial indexed position ready for the start of a sequence of bending operations on a further workpiece.

The stroke of the reciprocable carriage is preferably adjustable to suit the difference in length between the minimum length and the maximum length stop members of a set of stop members.

Workpiece stop means according to the invention can be relatively inexpensive compared with numerical control means since the workpiece stop means essentially only comprises the reciprocable carriage, the indexable holder, four pneumatic rams and a ratchet arrangement. The stop members of a set of stop members can be stamped to identify their sequence and the workpiece, bending of which they control, whereby the machine can readily be reset to effect bending operations on workpieces of a repeat order.

The invention is a diagrammatically illustrated by way of example in the accompanying drawings, in which:

FIG. 2 is a sectional view on line Ii—II of FIG. 1;

FIG. 3 is a front elevation of the workpiece stop means of FIGS. 1 and 2;

FIG. 4 is a sectional view on line IV—IV of FIG. 1;

FIG. 5 is a fragmentary plan view corresponding to part of FIG. 1 but with cover plates replaced and a set of stop members in positions for operation;

FIG. 6 is a view of a holder for the stop members as viewed in FIG. 2; and

FIG. 7 is a plan view of a ratchet member for engagement on the holder of FIG. 6.

Figure 1:
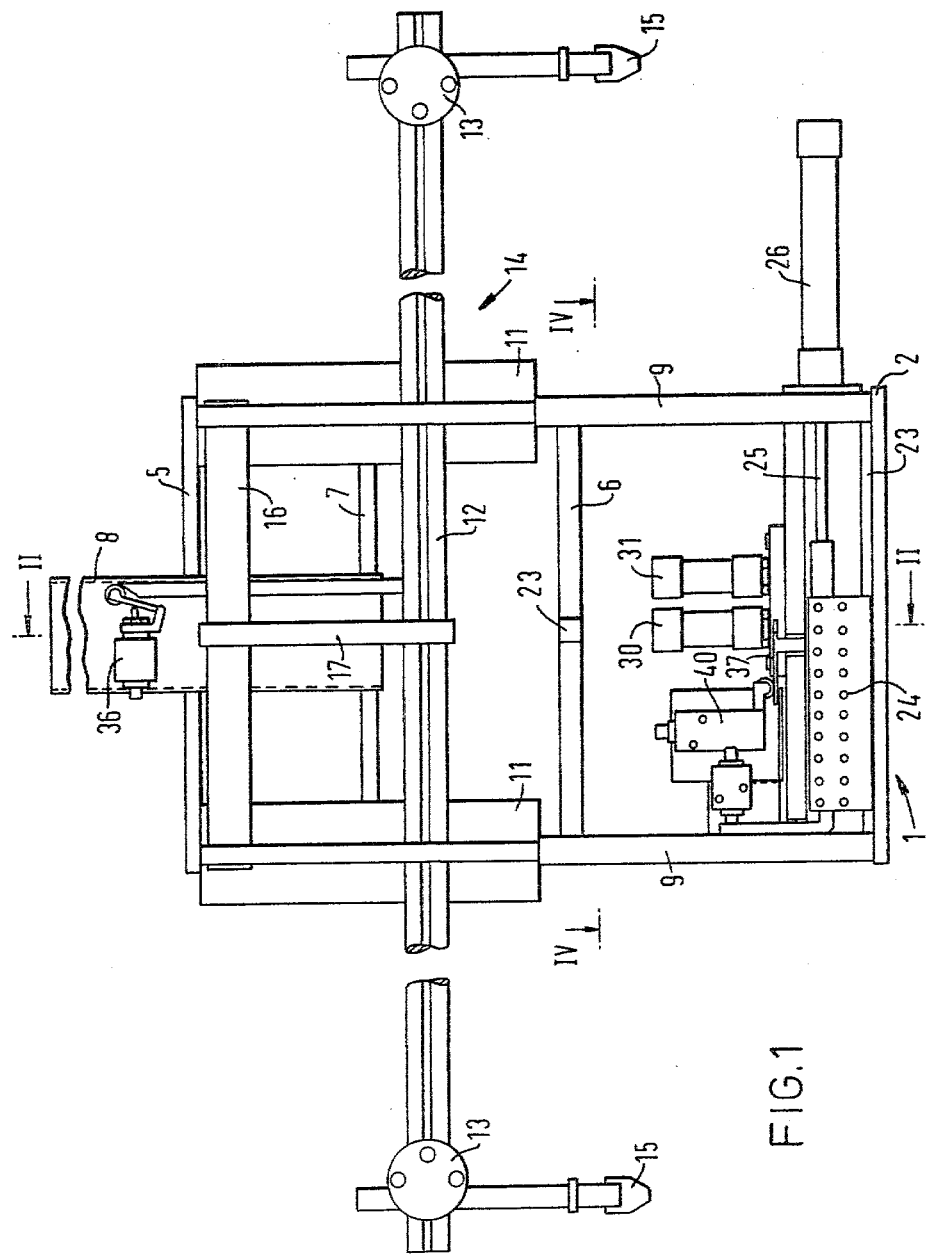
FIG. 1 is a plan view of workpiece stop means according to the invention with cover plates removed to show details.

Referring to the drawings, workpiece stop means comprises a frame 1 having a front member 2 with apertures 3 therein whereby it can be bolted to the rear face of the frame of a sheet metal bending machine which mounts a bottom tool. The frame 1 further comprises side members 4, a rear member 5 and intermediate members 6 and 7. The cylinder of a pneumatic ram 8 is welded to the intermediate member 7 and the rear member 5.

A respective guide rod 9 is mounted above each of the side members 4 and ball bushing pillow blocks 10 mount a carriage 14 for sliding movement on the guide rods 9. Inverted T-section members 11 couple together the front and rear pillow blocks 10 on each side and a main transverse rod 12 is engaged in the upstanding web of the inverted T-shaped members 11 and by means of turrets 13 mounts workpiece backstops 15. A further transverse rod 16 couples the rear ends of the webs of the inverted T-section members 11 and a vertical web 17 is mounted on the two transverse rods 12 and 16 and mounts an abutment member 18 (FIG. 2). The vertical web 17 is coupled to a piston 19 of the ram 8 such that pressurising the ram 8 causes the carriage 14 to move from the retracted position of FIGS. 1 and 2 towards the front plate 2, the abutment member 18 moving along a groove 20 between a pair of cover plates 21 and 22, not shown in FIG. 1, and through a groove 23 in the intermediate member 6.

Slidably mounted in a transverse direction on a dovetail projection 23 on the rear face of the front plate 2, is a holder 24. The holder 24 is coupled to the piston rod 25 of a pneumatic ram 26, pressure being applied to the ram 26 such that the holder 24 is normally biassed for movement in a rightward direction as viewed in FIGS. 1, 3 and 5. A ratchet bar 27 (FIG. 7) is secured in a recess 28 in the underside of the holder 24 and has teeth 29 which co-operate with a pair of pawls controlled by respective ones of alternately operable pneumatic rams 30 and 31 mounted beneath the cover plates 21 and 22. By alternate operation of the rams 30 and 31 the holder 24 can be indexed rightwardly under the bias of the ram 26. The holder 24 has a slot 32 in its rear face and ten pairs of threaded bores 33 in its upper face such that bolts engaged in the threaded bores 33 can project into the slot 32.

Mounted in the slot 32 and secured therein by bolts engaged in the threaded bores 33, are a plurality, as shown eight, of stop members 34a to 34h. The stop members 34 initially lie on the plate 21 and are omitted from FIG. 1. The front end face of each of the stop members 34 bears against a reference face 35 at the inner end of the slot 32 and each stop member 34, according to its length, provides an abutment stop for the abutment member 18 such that when the carriage is moved forwardly by the pneumatic ram 8 it will be arrested when the stop member 18 abuts against the rear end face of that one of the stop members 34 which overlies the groove 20 i.e. the ram 8 stalls when the abutment member 18 abuts the rear end of the stop member 34 and the carriage is maintained in that position and maintains the workpiece backstops 15 in a corresponding position. With a workpiece engaged with the backstops 15 an operation of the bending machine can then be effected. Operation of the bending machine automatically reverses the ram 8 to retract the carriage and such retraction triggers the alternately operable rams 30, 31 to cause an indexing movement to the right as viewed in FIG. 1 of the holder 24 thereby to move the first stop member 34a fully onto the plate 22 and the second stop member 34b over the groove 20 for abutment by the abutment member 18 when the ram 8, having been automatically reversed at its rearward position by an automatic return valve 36, moves the carriage forward again.

The machine will make a number of operations equivalent to the number of stop members 34 mounted in the holder 24 and following the operation set by the last one of the stop members 34, as shown in FIG. 5 the stop member 34h, a spring biassed bell-crank member 37 pivoted on an axis 38 and having a portion 39 extending into the groove 20, will be allowed to pivot clockwise as viewed in FIG. 4 about the pivot 38, since there is no longer a stop member 34 covering the groove 20, the clockwise movement of the bell-crank member 37 operating a valve 40 to reverse the thrust of the ram 26 and restore the holder 24 to its lefthand position such that the first of the stop members, 34a, is located above the groove 20 ready for a sequence of operations on a further workpiece.

Preferably the ram 8 is provided with means whereby the reverse travel thereof can be limited according to the maximum difference in length of the stop members 34 being used, thereby to shorten its cycle time. A leg, not shown, may be provided beneath the rear end of the frame 1 to support the rear end of the frame by engagement of the leg with the floor.

What is claimed is:

1. Workpiece stop means for a sheet metal working machine comprising a holder, a plurality of stop members mounted on said holder, a reference face on said holder, each of said stop members being of a respective determined length and being engagable with said holder with one end of each of said stop members abutting said reference face of said holder, a reciprocable carriage, an abutment member on said carriage, means for moving said holder sequentially to present said stop members each for abutment of its other end with said abutment member, a workpiece backstop of the machine mounted on said carriage and control means whereby, by said abutment of said abutment member with said other end of successive ones of said stop members, said carriage and thus said workpiece backstop is positioned at desired locations for successive operations of the machine.

2. Workpiece stop means as claimed in claim 1, wherein each of said stop members comprises a strip of metal accurately cut to a desired length.

3. Workpiece stop means as claimed in claim 1, wherein said carriage is reciprocable by a pneumatic ram.

4. Workpiece stop means as claimed in claim 3, wherein said means for moving said holder comprise a further pneumatic ram and said further pneumatic ram mounts a ratchet bar which co-operates with a pair of alternately operable pneumatically driven pawls to control the indexing movement.

5. Workpiece stop means as claimed in claim 4, including a frame with a front member to be secured to the sheet metal working machine and having said holder slidably mounted thereon, side members mounting rails on which said carriage is slidable, one of said side members mounting a cylinder of said further pneumatic ram and a rear member mounting a cylinder of said pneumatic ram.

* * * * *